Aug. 22, 1933.   W. B. TUCKER   1,923,126
ROTARY MACHINE PRIME MOVER POWER UNIT AND METHOD
OF ASSEMBLING AND DISMANTLING THE SAME
Filed June 16, 1932   6 Sheets-Sheet 1

Inventor
W. B. Tucker
by
Attorney

Aug. 22, 1933.  W. B. TUCKER  1,923,126
ROTARY MACHINE PRIME MOVER POWER UNIT AND METHOD
OF ASSEMBLING AND DISMANTLING THE SAME
Filed June 16, 1932   6 Sheets-Sheet 2

Inventor
W. B. Tucker
by
Attorney

Aug. 22, 1933.     W. B. TUCKER     1,923,126
ROTARY MACHINE PRIME MOVER POWER UNIT AND METHOD
OF ASSEMBLING AND DISMANTLING THE SAME
         Filed June 16, 1932        6 Sheets-Sheet 6

Patented Aug. 22, 1933

1,923,126

UNITED STATES PATENT OFFICE 1,923,126

ROTARY MACHINE-PRIME MOVER POWER UNIT AND METHOD OF ASSEMBLING AND DISMANTLING THE SAME

William B. Tucker, Milwaukee, Wis., assignor to Allis-Chalmers Manufacturing Company, Milwaukee, Wis., a Corporation of Delaware Application June 16, 1932. Serial No. 617,515

19 Claims. (Cl. 290—52)

This invention relates in general to the art of power units having a rotary machine driven by a prime mover, and relates more specifically to improved arrangements and improved methods of assembling and dismantling power units of the kind described above, wherein at least one of the machines of a unit comprises a rotor and a rotor-surrounding stator casing, as does the generator of a turbo-generator unit which comprises a turbine and an electric generator connected together by couplings or gearing, in cases where but limited space for each unit is provided or available and where the stator or rotor-surrounding casing of one of the machines of each unit is not conveniently or desirably divided or sectionalized in a plane substantially coincident with the axis of its rotor.

It has been the general practice in the design and construction of power houses, to make the enclosure or room in which the power units are to be located, of sufficient dimensions, to permit of the insertion or withdrawal of the rotor of each electric generator through the outboard end of its stator which usually is a solid substantially cylindrical rotor-surrounding structure but having a through cavity to receive the rotor, without appreciably moving the stator from its operative position.

Power units, to which this invention is directed, of the turbo-generator type, above described, when also of the horizontal shaft type, are set with relation to each other in either of two arrangements which are practically universal standards. These two arrangements are defined in this description, transverse (or side by side), and longitudinal (or end to end).

The transverse arrangement is used where the units are set side by side in a relatively wide room. With the transverse arrangement the dimensions of the room for the units are frequently defined, as to width, by piers or columns which support the overhead stories and walls of the power house, the roof thereof, and in most cases, the overhead load-carrying trusses or movable lifting cranes. This construction of the building is at times used to provide for assembling and dismantling of the horizontal shaft type of turbo-generator power units, including a stator and a rotor, by having each rotor project between the supporting piers or columns referred to and beyond the room for the units proper during the assembling and dismantling operations of the units.

The longitudinal arrangement is used where the units are set end to end in a relatively narrow room. Space is provided between the ends of the units to permit of assembling and dismantling by moving the generator rotor into or out of the fixed generator stator through the outboard end thereof.

This invention, by novel arrangements and combinations of constructional features and by methods of assembling and dismantling, reduces to a new minimum, that is, a minimum under that required by the methods disclosed in the Brown Patent 1,802,870, the dimensions required for the room housing the power units, of the kind described above, for a given power unit, whether the arrangement followed is transverse or longitudinal or whether the bounding walls are continuous or are provided with openings or pockets for purposes of facilitating the assembling and dismantling operations.

It is an object of this invention to provide improvements in the arrangements of power units, of the kind described above, wherein one of the machines of each unit may be retained in its operative position, while the rotor of the other machine of a unit is inserted into or withdrawn from its stator through the inboard end thereof, and with the space between the outboard end of the stator and a power house wall or other barrier, such as an opposed end of another machine, of a value much reduced below that required in practicing the methods of inboard end assembling or dismantling of the generator heretofore known and this without disturbing the major portion of the other machine of each particular unit.

Another object of this invention is to provide a power unit, comprising a prime mover-driven rotary machine, which may be conveniently installed in a power house having limited available floor space and more especially, restricted dimensions lengthwise of the unit.

A further object of this invention is to provide improved methods of assembling and dismantling connected-prime mover-rotary machine units, such as turbo-generators, whereby relatively large and cumbersome parts thereof may be conveniently installed or removed.

Another object of this invention is to provide improved arrangements of turbo-generator units and improved methods of assembling and dismantling the electric generator of each turbo-generator unit, where the space available lengthwise of a unit is small and does not permit outboard removal or insertion of the rotor of the generator and where the stator of the generator is substantially a cylinder and presents a circumferentially unitary rotor-surrounding casing open only at its ends for the insertion into or the withdrawal of the rotor from its cavity in the stator casing.

A further object of this invention is to provide improved arrangements of power units, of the kind described, and improvements in the methods of assembling and dismantling the same, whereby the space required for the movable cranes for lifting the heavy and cumbersome parts may be restricted.

These and other objects of the present invention will be apparent from the following description.

A clear conception of embodiments of the invention and of the methods thereunder of assembling and dismantling power units, may be attained by referring to the drawings accompanying and forming a part of this specification, and on which like reference characters designate the same or similar parts or elements throughout the various views.

Referring to the drawings by characters of reference, a power house is represented by a wall 27 and a foundation 26. The foundation 26 is shown supporting in assembled condition a turbo-generator unit of the horizontal shaft type, the generator of which rests upon a bed plate 21 comprising spaced members directly engaging the flat bottom portions of the otherwise cylindrical stator casing 1 thereof. The stator casing 1 further comprises end bells 7 removable from the body portion of the stator casing. The body portion of the stator casing provides a circumferentially unitary shell surrounding the rotor 4 of the generator. The stator 1 is provided with the coils or windings 16 and is also provided with a through cavity which receives the rotor 4, permitting the rotor 4 to be withdrawn through either end.

The generator is driven by a prime mover, as illustrated, in the form of a steam turbine 2 having an exhaust cover 23 detachable from the body portion of the turbine 2. The shaft of the turbine 2 is connected with the aligned shaft portions of the rotor 4 of the generator through means such as a claw coupling 29. The shaft portions at the ends of the rotor 4 are journaled in capped bearings 5 and 6, respectively, at the outboard and at the inboard end of the stator casing 1. The shaft portions of the rotor 4 and the shaft of the turbine 2 are shown as coaxial but this relation is not a limiting relation nor essential, in following the methods of this invention and the coaxial axes of the two machines comprising the unit depicted are directed transversely to a straight faced wall continuing for some distance. It is pointed out here, however, that the wall 27 serving as a definite barrier to the endwise movement of the shown power unit, that a barrier in the form of a relatively fixed and immovable machine or object within the power house may require the practice of the methods of assembling or dismantling of a power unit of this invention, in connection with a power unit which may be located or required to be located within a power house with respect to such a barrier as is the shown power unit with respect to the shown wall 27.

Since it is now common practice to couple an exciter 3 to the outboard shaft portion of the rotor 4, such an ancillary means for the generator is shown on the drawings and the extent of the axial length of the exciter together with the overall length of the generator, may in the limit, determine the minimum distance at which the turbine 2 or other prime mover may be transversely spaced from the wall 27 or equivalent barrier, in following the method of assembling and dismantling to which Figs. 1-9 are directed.

Figure 1:
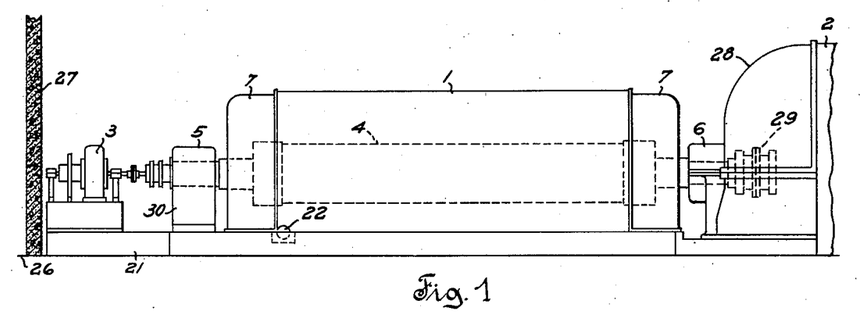
Fig. 1 is a fragmentary side elevation of a turbo-generator unit arranged and assembled, according to this invention, within a power house, only the wall of the power house adjacent one end of the unit being shown for simplicity and conciseness.
Figure 2:
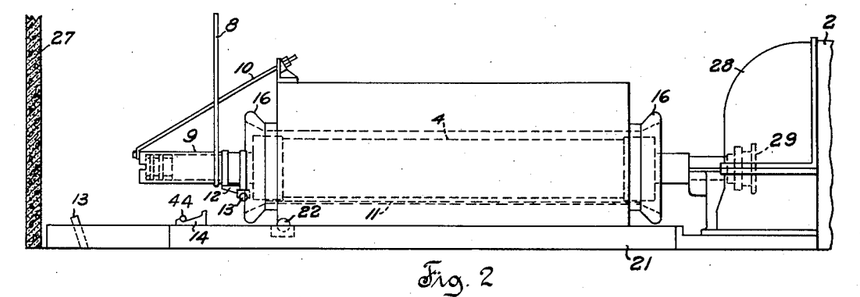
Figs. 2, 3, 4, 5, 6, 7, 8 and 9 are views conforming to Fig. 1 and showing the generator thereof, in different stages of dismantling.

According to this method, after the claw coupling 29 has been manipulated to disconnect the rotor 4 from the turbine shaft, the end bells 7 removed from the body portion of the stator casing 1, the caps of bearings 5 and 6 as well as the exciter 3 removed sufficiently from their operative positions, the metal plates 11 placed on the lower inner surface of the stator casing 1, to form a track for the wheels 13 of a carriage or truck 12 secured to the inner portion of the outboard shaft portion of the rotor 4, the outboard end of the rotor 4 may be slightly elevated through a pair of cables 8 of a lifting crane or cranes to allow of removing of the pedestal 30 for the bearing 5. At this time a sleeve 9 which may be split to permit its being sectionally applied to the extremity of the shaft portion of the rotor 4 at the outboard end thereof, to preclude the necessity of providing a space between this end of the shaft portion of the rotor 4 and the wall 27 or other barrier, to allow of telescoping application of the sleeve, is applied and held in its applied position by means of rods 10 suitably attached at their ends to the body portion of the stator casing 1 and to the sleeve 9. The sleeve 9 has a dual function in that it prevents axial motion of the rotor 4 relative to the stator during the tilting of the generator and also protects the shaft portion of the rotor 4 which it envelopes from direct impact with the foundation during tilting and from the jack used in projecting the rotor out of the stator casing. At this time rack 14 with its roller 44 or just before tilting the stator casing together with its rotor, which comprises the first essential step of this method of dismantling, may be located beneath the applied sleeve 9 which, in the fully tilted position of the generator, is to roll on the roller 44 during the initial portion of the step of projecting the rotor 4 out of the stator casing 1. After the cables 8 have served to elevate the said end of the rotor 4 sufficiently to permit removing the pedestal 30 and the plates 11 have been inserted in the space between the rotor 4 and the inner surface of the stator casing, the generator is prepared for full tilting about a hinge 22 which may take the form either of sockets or projections on the flat portions adjacent the bottom of the body portion of the stator casing 1 and corresponding projections or sockets in the side members forming the generator bed plate 21, or the hinge 22 may be formed by cooperating pairs of sockets in the body portion of the stator casing 1 and in the bed plate 21 with a cylindrical member in each cylindrical pocket so formed. It may here be pointed out that lifting one end of the generator, with the rotor within the stator, requires less lifting power than would be required if the stator were bodily lifted alone because it is heavier than the rotor.

Figure 3:
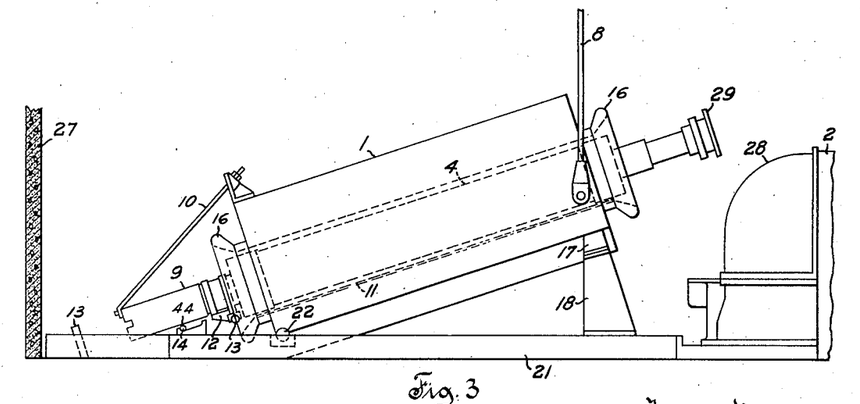

As depicted in Fig. 3 a hitch is then taken at the sides of the stator casing, at the other end thereof, with the cables 8 and the generator moved to full tilted position shown in Fig. 3, necessary for the rotor 4 to clear the turbine 2 if the exhaust cover 28 thereof be not removed, and held in this position by means of props 17 and 18. The prop 18 by itself may, however, serve to hold the generator at the tilt required in order that the rotor 4 clear the turbine 2, if the exhaust cover 28 thereof has been removed.

Figures 4, 5, 7:
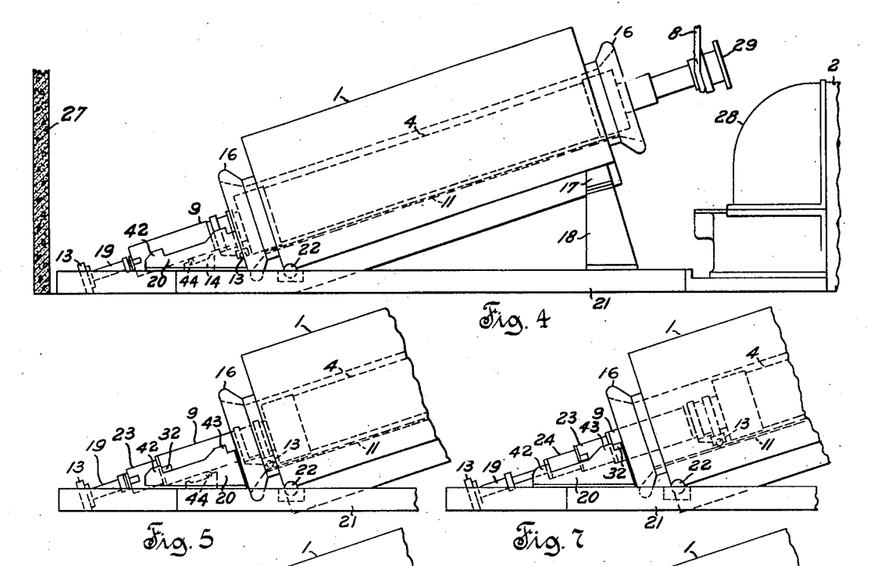

As indicated in Fig. 4 preliminary to an initial projecting movement of the rotor 4, a pair of supporting plates 20 each having an edge inclined generally in the direction of the full tilt of the generator and a rest or abutment at the upper and lower end of this edge, is secured to the side members forming the generator bed plate 21. With the cable 8 now applied to the inboard end shaft portion of the rotor 4 to assist in the lifting and projecting of the rotor 4 out of the stator casing 1, a jack 19 is placed between a reaction block 13 at the wall end of the generator bed plate 21 and the outer end of the sleeve 9, which may now be disconnected from the rods 10, and the jack operated to project the rotor a distance equal to the full extension of the jack 19 during which time the sleeve 9, from what has been said before, will roll on the roller 44 and the wheels of the carriage or truck 12 will have rolled on the plates 11 a certain distance as indicated in Fig. 5 and the truck 12 now relieves the roller 44 from carrying its load of the rotor 4.

As further indicated in Fig. 5 the thrust carried by the jack 19 may now be transferred to a bar 32 passing transversely through the sleeve 9 adjacent the outer or closed end thereof and resting with its extending ends against the lower rests or abutments 42 provided in the supporting plates 20, to permit of the substitution of a filler piece 23 for the receding portion of the jack 19 as the jack is brought to its initial state or condition necessary to again be able to utilize the full throw of the jack.

Figures 6, 8, 9:
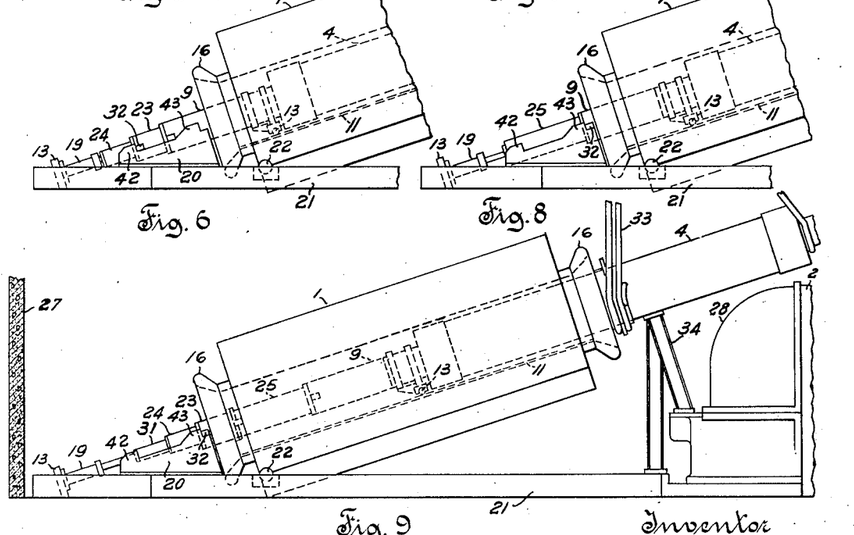

As the jack is now operated to the full extent of its throw or stroke, the filler piece 23 and the rotor 4 reach the positions indicated in Fig. 6. To again allow of transferring the thrust on the jack 19 to the bar 32 it is passed through the filler piece 23, which bar is otherwise related at this time as described above, and a second filler piece 24 may now be substituted for the receding portion of the jack 19 as it is again brought to its initial state, whereupon the arrangement of the parts is as clearly depicted in Fig. 6.

As the jack 19 is now again operated the sleeve 9 and the filler pieces 23 and 24 are brought to the positions shown in Fig. 7. At the completion of this stroke of the jack 19, rotor 4 will again have been projected a corresponding amount and is held free from contact with the inboard end of the stator casing by proper manipulation of the cable 8 supporting the inboard end of the rotor 4. The sleeve 9 is now located so that the bar 32 may again be passed transversely therethrough, as described above, and the extending ends of the bar 32 resting against the upper rests or abutments 43 in the supporting plates 20, the thrust on the jack 19 may again be transferred to the bar 32, and the extending portion of the jack 19 then made to recede to again bring the jack 19 to its initial state or condition. The filler pieces 23 and 24 may now be replaced by a single filler piece 25 as indicated in Fig. 8.

The rotor 4 may now be sucessively projected by amounts equal to the throws of the jack 19 to bring the rotor 4 in the position of projection or withdrawal indicated by Fig. 9.

At the conclusions of these successive projections the filler pieces and bars 32 and rests on the supporting plates 20 will be related in the following sequential order.

Bar 32, passing through the filler piece 25 adjacent to its outer end, will be resting against the lower rests 42.

With filler piece 23 having been added, the bar 32, passing through the filler piece 23, will again be resting against the lower rests 42.

After the next excursion of the jack 19 and with the filler piece 24 having been added, the bar 32 passing through the filler piece 25, will rest against the upper rests 43.

After the next excursion of the jack 19 and with another filler piece 31 also having been added, the bar 32, passing through the filler piece 23, will again be resting against the upper rests provided in the supporting plates 20.

With these latter successive excursions of the jack 19 completed, it is supposed that the rotor 4 is now located with respect to the stator casing 1, as illustrated by Fig. 9. In this position of the rotor 4 a crane-lifting rig 33 can be placed about the center of gravity of the rotor as shown in Fig. 9. While this hitch is being made the rotor 4 is temporarily supported by props 34. The filler pieces 31, 23 and 25 are removed and the rotor 4 completely withdrawn or projected from the stator casing 1, over the turbine 2 by means of a crane or cranes connected with the lifting rig 33.

From the foregoing description of this method of dismantling the power unit, the method of assembling the same should also be clearly apparent. When assembling a unit according to this method, as well as according to the other methods of dismantling about to be described, the steps will be carried out in the reverse order of the described dismantling process, the same special equipment being employed in both the assembling and dismantling processes.

Figure 10:
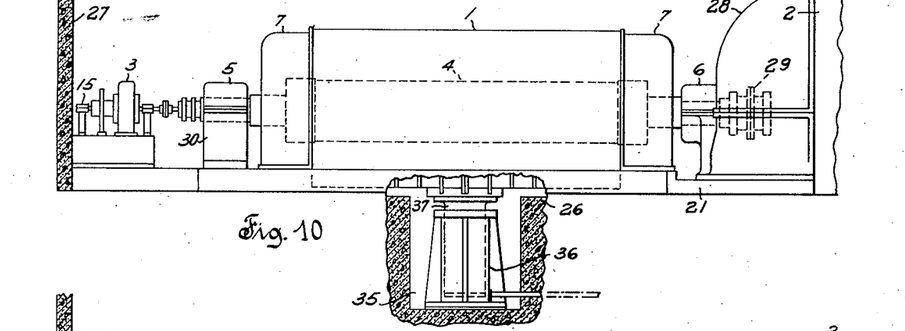
Fig. 10 is a fragmentary side elevation of a turbo-generator unit also arranged and assembled, according to this invention, within a power house, in combination with a rotatable lifting jack and, therefore, indicates another method of assembling or dismantling a turbo-generator unit according to this invention.

Now referring to Fig. 10 wherein is illustrated another turbo-generator unit arranged and assembled, according to another method of this invention, within a power house.

The arrangement of this figure differs from that of the similar arrangement shown in Fig. 1 in that the foundation 26, forming with the wall 27 parts of the power house in which the unit is mounted, is provided with a recess 35 to receive rotatable supporting means in which the functions of elevation and rotation may either reside in separate structures, as jacks and in the cribbing methods of Figs. 17-21 of this disclosure and a portable turn-table adapted for rotation, or in a single structure. This means as illustrated takes the form of a jacking device 36 having a rotatable plunger 37 arranged to elevate and to permit rotation of the generator of the power unit while carried thereby, after, of course, the caps 5 and 6 have been first removed, which device 36 accordingly has an elevating function in addition to a rotating support function.

A motor-driven pumping unit 38 receives a suitable liquid from a source and delivers said liquid to a chamber formed in the jacking device 36, at the required unit pressures so that the plunger 37 subjected to the pressures of the liquid in the chamber will be capable of elevating the generator when it is disconnected from the exciter 3 and from the shaft of the turbine 2 by disconnecting the exciter coupling and claw coupling 29, respectively.

Figure 11:
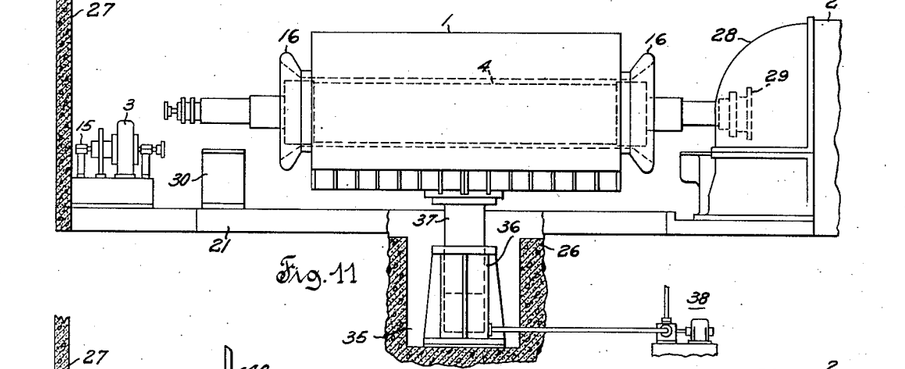
Figs. 11, 12, 13, 14 and 15 are views conforming to Fig. 10 and showing the generator thereof in different stages of dismantling under the method indicated by Fig. 10.

As appears in Fig. 11 in following this method, if the usual exciter 3 be eliminated from the power unit, the wall 27 or other barrier may be located hard by the rotor shaft portion at the outboard end of the rotor 4. While if the exciter is included as a part of the unit, as shown, the wall 27 may be hard by the outer bearing 15 of the exciter 3.

Figure 12:
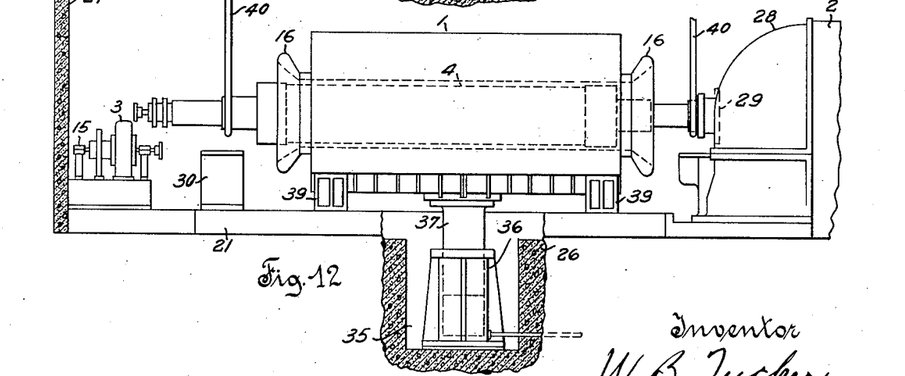

Fig. 11 further shows the end bells 7 of the stator casing 1 of the generator, removed and the generator in this condition and including its rotor 4 supported by the stator, is elevated to the desired elevation as depicted by Fig. 11, by supplying the required liquid pressure by means of the pumping unit 38 to the chamber of the hydraulic jacking device 36. If the exhaust cover 28 of the turbine 2 has not been also temporarily removed as also appears from Fig. 11, the rotor 4 may have to be axially shifted a certain distance to permit rotation of the generator on the vertical axis of the jacking device-rotatable plunger 37, or to permit in other words a rotary displacement of the generator out of alignment with the axis of the turbine shaft. To effect such necessary shifting of the rotor 4 under the illustrated condition, the generator is dropped a slight distance so that its weight may temporarily be carried by blocks 39 resting directly upon the generator bed plate 21 in a manner to preclude movement of the stator casing 1 as the rotor, therein still located, is axially shifted. Fig. 12 shows cables 40 of a suitable crane or cranes secured to the shaft portions of the rotor 4 at the ends thereof, for effecting the necessary shifting to bring the rotor 4 in the position also shown in Fig. 12. In this position of the rotor 4 with respect to the turbine 2 the generator is prepared for rotation through a sufficient angle, see Fig. 13. But before this rotation is effected the jacking device 36 is operated to slightly lift the stator casing in order that the rotatable plunger 37 may again carry its load and in addition thereto the load of the rotor 4 which during the act of rotating the generator through the particular angle need no longer be carried by the cables 40 employed in shifting the rotor.

Figure 13:
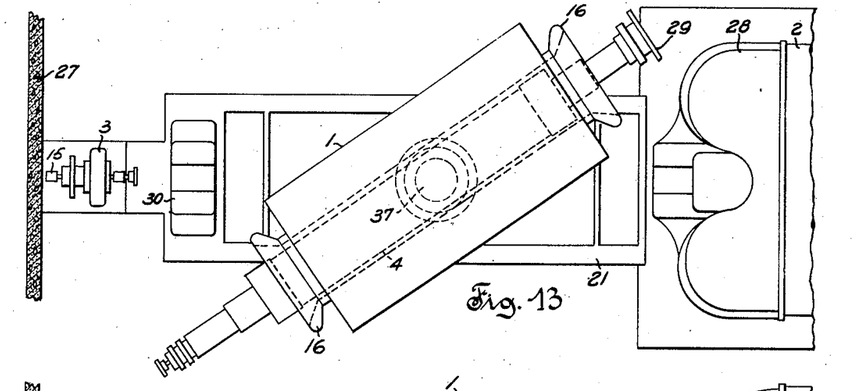
Figures 14, 15:
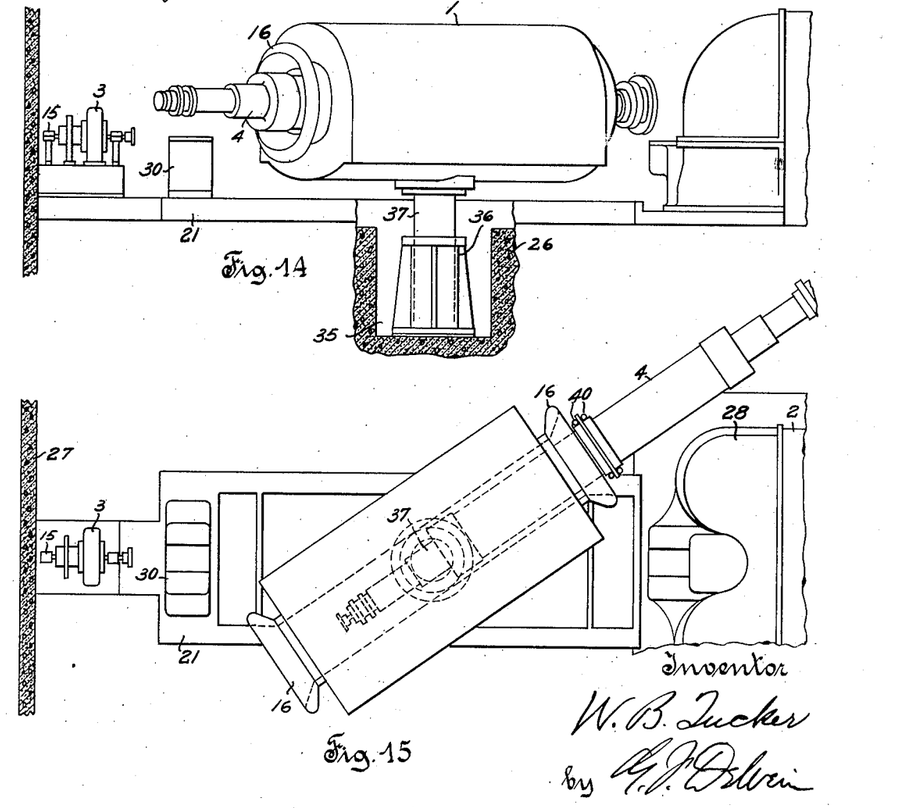

Fig. 14 is a corresponding elevational view to the plan view of Fig. 13 of the power unit, at this stage of the dismantling process of the generator thereof. Before the projection or withdrawal of the rotor 4 from the stator casing 1 in this position of the generator is effected, the stator casing may desirably be supported by the blocks, not shown, resting on the foundation 26, and the load of the generator thus incidentally taken off the jacking device 36. The step of completely removing the rotor 4 from the stator casing 1 may now be started and a final hitch made about the center of gravity of the rotor 4 by crane cables 40, as indicated in the plan view of Fig. 15, to complete the withdrawal of the rotor through the use of said cables.

Figure 16:
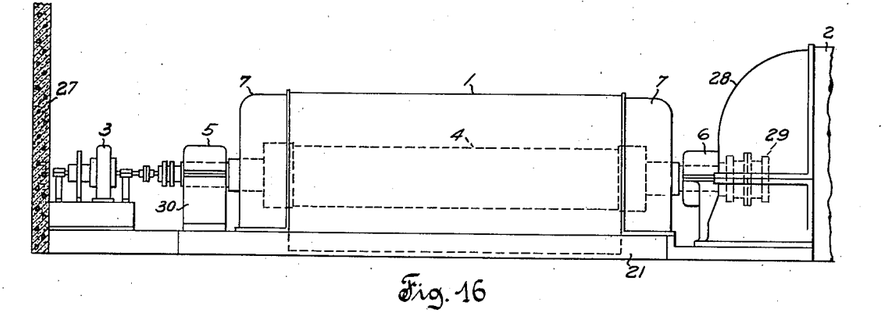
Fig. 16 is a fragmentary side elevation of a turbo-generator unit also arranged and assembled according to this invention within a power house.
Figure 17:
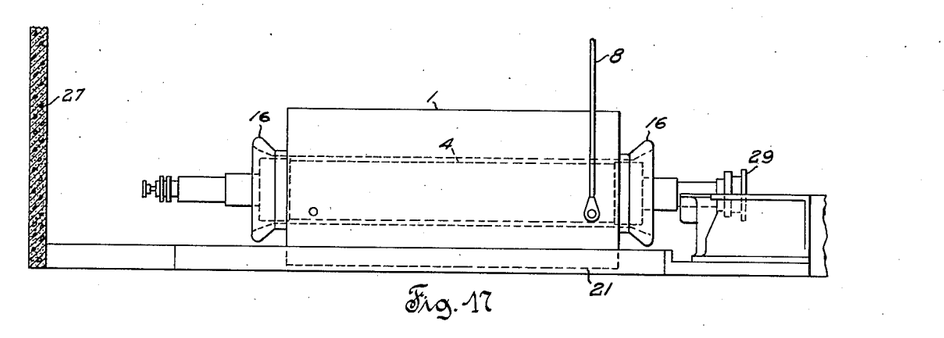
Figs. 17, 18, 19, 20 and 21 are views conforming to Fig. 16 together with a showing of further means for dismantling a unit according to another method of this invention and showing the generator thereof in different stages of dismantling.
Figure 18:
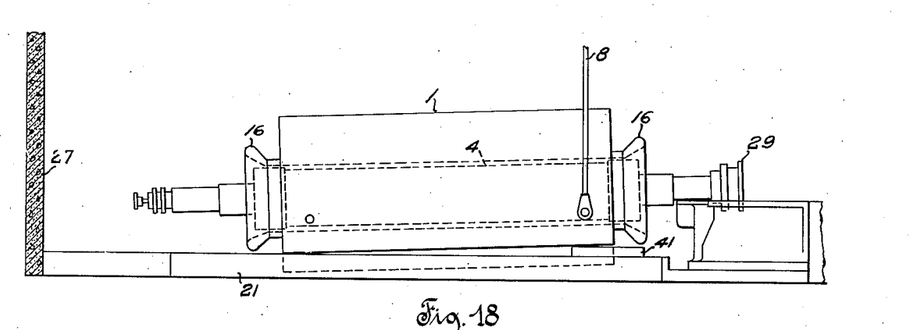
Figure 19:
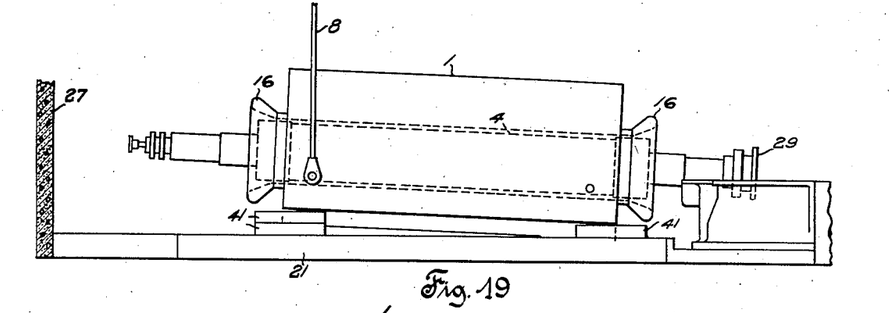
Figure 20:
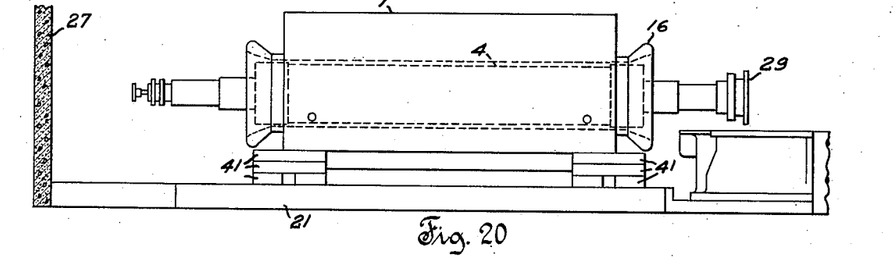

Now referring to Fig. 16 which shows a power unit assembled, as does Fig. 10, and which power unit is redrawn here to bring it together with further showings of the unit when dismantled according to another method of this invention. Fig. 17 shows the exciter 3, bearings 5 and 6, pedestal 30, end bells 7 of the stator casing, and exhaust cover 28 of the turbine removed from the unit, and cables 8 attached to the side portions of the body portion of the stator casing 1 adjacent the inboard end thereof. By means of a crane or cranes the cables 8 may then be employed to lift this end of the stator casing 1 together with the rotor 4 a sufficient distance as shown in Fig. 18 and piling blocks 41 located to form a rest for this end of the generator after the cables 8 have been disconnected from this end of the generator. The cables 8 are then connected to the body portion of the stator casing 1 adjacent the other end of the generator, as shown in Fig. 19, and this end of the generator sufficiently raised through lifting forces applied to the cables 8, to be able to block up this end of the generator with other piling blocks 41. These cribbing operations are successively repeated and additional piling blocks, for supporting the generator as indicated by Fig. 20, employed to bring the generator at the elevation at which it is high enough to permit withdrawal of the rotor 4 from the stator casing 1 through the inboard end thereof. The rotor 4 may now be withdrawn in a customary manner over the lower half of the turbine 2.

Figure 21:
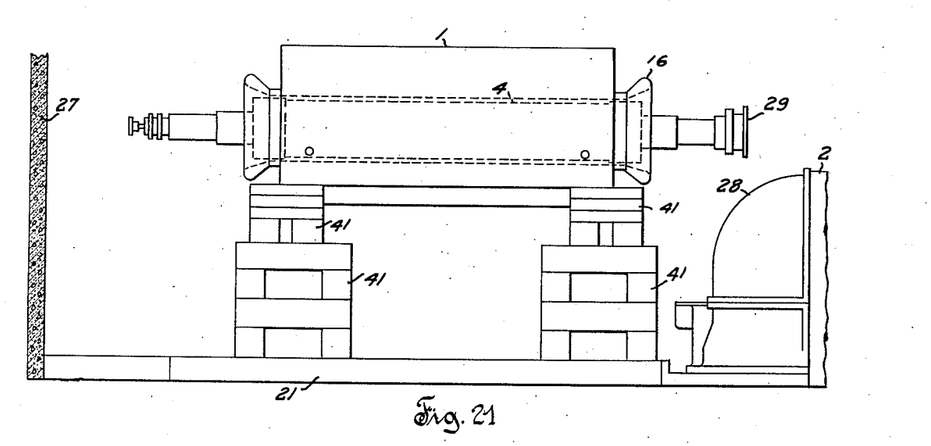

Since the shape of the exhaust cover 28 of the turbine 2 is as shown in the plan view of Fig. 13, that is, having a depression in line with the axis of the rotor 4 in its operative position, and continuing above the horizontal plane of said axis, upon completing further cribbing and blocking operations, as indicated in Fig. 21, the generator may be located at an elevation at which the rotor 4 thereof may be withdrawn from the stator casing 1 through the inboard end and over the turbine 2 and this without having first removed the exhaust cover 28 thereof.

From the above description it will be apparent that the improved arrangements of the turbo-generator power units are of such natures, that the turbine 2 may be retained in its operative position, while the generator comprising essentially of the stator casing 1 and rotor 4 may be conveniently installed or removed, in places where the floor space available for these operations is limited to the lengths occupied by the unit, or in other words, the unit may be installed or removed within a relatively confined space and this without any longitudinal division of the stator casing 1. The location of the power house wall 27, or other barrier, is such that it would be impossible to remove the rotor 4 from the outboard end of the stator casing 1 in the usual manner, without damaging the rotor 4 or the wall 27. The invention obviously makes it possible to utilize a much smaller power house, thereby materially decreasing the cost of a new power plant, and also enabling the installation of relatively large power units in existing power houses having limited floor space. It will be noted also that the spacing of the wall 27 from the turbine 2 is not subject to the limitation of the method disclosed in the Brown patent, before referred to, namely, that it is less than double the length of the generator. In fact the methods of this invention are not restricted as to their application to any particular relation between the said space and the length of the generator. In the first described method of this invention the space required for the jack 19 alone limits the extent of the space required between the wall 27 and the adjacent end of a power unit and with the other two methods of this invention no space is necessary between the wall 27 and the adjacent end of the respective units. The invention is of special importance in cases where the size of the power house must be limited because of excessive cost of the land therefore or due to the fact that there are adjoining buildings.

While the invention has been shown and described herein as specifically applied to a turbo-generator-power house installation it is not intended to limit the scope of the claims by such specific disclosure. It will be apparent that the novel methods may also be applicable to other forms of power installations, such as motor driven pump installations, or the like. And the use of the specific terms "turbine" and "generator" is not intended to operate as a limitation of the invention to machines embodying these particular elements, but should be more broadly interpreted to cover any machine having similar characteristics.

It is to be further understood that it is not desired to limit the invention to the exact steps of the methods or to the precise details of the constructions herein shown and described, for various modifications within the scope of the claims may occur to persons skilled in the art to which this invention appertains.

It is claimed and desired to secure by Letters Patent:

1. The method of dismantling a power unit comprising a rotary machine and a prime mover connected thereto, said machine having a rotor and a rotor-surrounding stator, and said machine having an end facing said prime mover, which comprises, displacing the machine out of alignment with the operating axis of its rotor and then removing the rotor from the stator of the machine through said end of its stator.

2. The method of dismantling a power unit comprising a rotary machine and a connected prime mover, said machine having a rotor and a rotor-surrounding stator, said machine having an end facing a barrier of a power house in which the unit is mounted and the rotor of the machine in the operative condition of the unit being rotatable about an axis extending substantially transversely of said barrier, through means connecting the rotor and prime mover, which comprises, displacing the machine out of alignment with the operating axis of its rotor, and then removing the rotor from the stator of the machine through the end thereof located remote from said barrier.

3. The method of dismantling a power unit comprising a generator and a prime mover, said generator having a rotor and a stator surrounding said rotor and said prime mover having a driving member rotating on an axis extending substantially transversely of a barrier of a power house in which the unit is mounted, said generator having an end facing said member and an end facing said barrier, said rotor having an operating axis coaxial with the axis of said member, and the prime mover being spaced a minimum distance from said barrier, which comprises, displacing the generator out of alignment with the axis of the member, and then removing the rotor from the stator of the generator through the end thereof which faced said member.

4. The method of dismantling a horizontal turbo-generator unit comprising a turbine and a generator direct-connected thereto, said turbine having an end facing said generator, and said generator having a rotor and a circumferentially unitary, rotor-surrounding stator casing, said turbine and said rotor having coaxial axes extending substantially transversely of a wall of a power house in which the unit is operatively mounted, the free end of said generator being located closely adjacent to said wall, which comprises, displacing the generator so that the axis of its rotor is out of alignment with the axis of the turbine, and withdrawing the rotor of the generator through the end of its stator casing which faced the turbine.

5. The method of dismantling a direct-connected double-rotor power unit including a rotary machine and a rotary power transforming machine having a circumferentially unitary, rotor-surrounding stator casing and a rotor, said rotary machine and rotor having coaxial operating axes directed substantially transversely of a power house wall, said rotary machine being flexdly positioned at a minimum distance from said wall, and said power transforming machine being located intermediate the wall and the rotary machine, which comprises, displacing the stator casing and contained rotor out of alignment with the axis of the rotary machine, and withdrawing the rotor through the end of the stator casing which faced the rotary machine.

6. The method of assembling a power unit comprising a rotary machine and a prime mover, said machine having a rotor and a rotor-surrounding stator, the unit to be mounted in a power house having a barrier, said machine to have an end facing said barrier, and the rotor of the machine in the operative condition of the unit to be rotatable about an axis extending substantially transversely of said barrier, through means to connect the rotor and prime mover, which comprises, fixedly positioning the prime mover, bringing the stator into a preliminary non-aligned position with the operating axis for its rotor and intermediate the barrier and the prime mover, inserting the rotor into the stator through the end thereof which is to face the prime mover, and moving the stator, now including the rotor, out of its preliminary position and into alignment with the operating axis for its rotor.

7. The method of assembling a power unit comprising a generator and a prime mover, said generator having a rotor and a stator surrounding said rotor, said prime mover having a driving member rotatable about an axis, the unit to be mounted in a power house having a barrier, said generator to have an end facing said barrier and an end facing said prime mover, said rotor and said member to have coaxial operating axes, which comprises, fixedly positioning said prime mover with the axis of its rotatable member extending generally transversely of said barrier, bringing the stator into a preliminary non-aligned position intermediate the barrier and the prime mover, inserting the rotor into the stator through the end thereof which is to face the prime mover, and moving the stator, now including the rotor, out of its preliminary position and into alignment with the axis of the member.

8. The method of assembling a horizontal turbo-generator unit comprising a turbine and generator to be direct-connected thereto, said turbine to have an end facing said generator, and said generator having a rotor and a circumferentially unitary rotor-surrounding stator casing, said turbine and said rotor to have coaxial axes extending substantially transversely of a wall of a power house in which the unit is to be operatively mounted with the free end of the generator located closely adjacent to said wall, which comprises, fixedly positioning the turbine with its axis extending substantially transversely of a power house wall, bringing the stator casing into a preliminary non-aligned position intermediate the wall and the turbine, inserting the rotor into the stator casing through the end thereof which is to face the turbine, and moving the stator, now including the rotor, out of its preliminary position and into alignment with the axis of the turbine.

9. The method of assembling a direct-connected double-rotor power unit including a rotary machine and a rotary power transforming machine having a circumferentially unitary, rotor-surrounding stator casing and a rotor, said rotary machine and rotor intended to have coaxial operating axes directed substantially transversely of a power house wall, which comprises, fixedly positioning the rotary machine at a minimum distance from and transversely of the wall, bringing the stator casing into a preliminary non-aligned position intermediate the wall and the rotary machine, inserting the rotor into the stator casing through the end thereof which is to face the rotary machine, and moving the stator casing, now including the rotor, out of its preliminary position and into alignment with the axis of the rotary machine.

10. In combination, a prime mover, a rotary machine connected thereto and comprising a rotor and a rotor-surrounding stator, the rotary machine having an end facing said prime mover, means for displacing the rotary machine to a position wherein its axis is out of alignment with the operating axis for its rotor, and means for withdrawing the rotor out of the machine through said end of its stator.

11. In combination, a prime mover, a rotary machine connected thereto and comprising a rotor and a rotor-surrounding stator, a barrier facing the free end of the machine, and the rotor of the machine having an operating axis extending generally transversely of said barrier, the free end of said machine being closely adjacent said barrier, means for displacing the rotary machine to a position wherein its axis is out of alignment with the operating axis for its rotor, and means for withdrawing the rotor out of the machine through the other end of its stator.

12. In combination, a prime mover having a member rotatable about an axis, a generator driven by said prime mover and comprising a rotor and a rotor-surrounding stator, the rotor of said generator and the member of said prime mover having coaxial operating axes extending generally transversely of the barrier, the free end of said generator being closely adjacent said barrier, means for displacing the generator to a position wherein its axis is out of alignment with the axis of said member, and means for moving the rotor out of the generator through the other end of the stator.

13. In combination, a prime mover having a member rotatable about an axis, a generator driven by said prime mover and comprising a rotor and a rotor-surrounding stator, the rotor of said generator and the member of said prime mover having coaxial operating axes extending generally transversely of a barrier, the free end of said generator being closely adjacent said barrier, means for displacing the generator to a position wherein its axis is out of alignment with the axis of said member, and means for rolling the rotor out of the generator through the other end of the stator.

14. In combination, a rotary prime mover, a generator comprising a rotor direct-connected to said prime mover and a circumferentially unitary, rotor-surrounding stator casing, a wall adjacent the free end of the generator, said prime mover and rotor of said generator rotating about coaxial operating axes directed substantially transversely of said wall, means for displacing the generator so that its axis is out of alignment with the axis of the prime mover, and means for moving the rotor of the generator through the other end of its stator casing.

15. In combination, a rotary machine, a rotary power transforming machine comprising a rotor direct-connected to said rotary machine and a circumferentially unitary, rotor-surrounding stator casing, a barrier immediately adjacent the free end of the power transforming machine, said rotary machine and power transforming machine rotating about coaxial operating axes directed substantially transversely of said wall, means for displacing the axis of the power transforming machine out of alignment with the axis of the rotary machine, and means for then removing the rotor of the power transforming machine through the other end thereof.

16. The method of dismantling a horizontal turbo-generator unit comprising a turbine and a generator, said turbine having an end adjacent said generator, and said generator having a rotor and a rotor-surrounding stator, said turbine and said generator having coaxial operating axes extending substantially transversely of a wall of a power house within which the unit is mounted, said generator having its other end closely adjacent said wall, which comprises, removing the bearings supporting the rotor, tilting the generator away from the turbine and supporting same in the tilted position, partially removing the rotor from the generator through combined simultaneously applied lifting and shoving operations, and then completely withdrawing the rotor, over the turbine, and through the turbine-adjacent end of the generator stator.

17. The method of dismantling a horizontal turbo-generator unit comprising a turbine and a generator, said turbine having an end adjacent said generator, and said generator having a rotor and rotor-surrounding stator, said turbine and said generator having coaxial operating axes extending substantially transversely of a wall of a power house within which the unit is mounted, said generator having its other end closely adjacent said wall, which comprises, removing the bearings supporting the rotor, tilting the generator away from the turbine and supporting the same in the tilted position, partially removing the rotor from the generator by rolling, through combined simultaneously applied lifting and shoving operations, and then completely withdrawing the rotor, over the turbine, and through the turbine-adjacent end of the generator stator.

18. The method of assembling a horizontal turbo-generator unit comprising a turbine and a generator, said turbine to have an end adjacent the generator, and said generator having a rotor and rotor-surrounding stator, said turbine and said generator to have coaxial operating axes extending substantially transversely of a wall of a power house within which the unit is to be mounted, said generator to have its other end closely adjacent said wall, which comprises, fixedly positioning the turbine at a minimum distance from said wall, bringing the stator of the generator into tilted position in location, intermediate the wall and the turbine, and supporting same in the tilted position, partially inserting the rotor into the generator through the turbine-adjacent end of the generator, over the turbine, completing the insertion of the rotor through combined simultaneously applied retracting, lifting and shoving operations, and replacing the bearings supporting the rotor.

19. The method of assembling a horizontal turbo-generator unit comprising a turbine and a generator, said turbine to have an end adjacent the generator, and said generator having a rotor and a rotor-surrounding stator, said turbine and said generator to have coaxial operating axes extending substantially transversely of a wall of a power house within which the unit is to be mounted, said generator to have its other end closely adjacent said wall, which comprises, fixedly positioning the turbine at a minimum distance from said wall, bringing the stator of the generator into tilted position in location, intermediate the wall and the turbine, and supporting same in the tilted position, partially inserting the rotor into the generator through the turbine-adjacent end of the generator, over the turbine, and completing the insertion of the rotor by rolling, through combined simultaneously applied retracting, lifting and shoving operations, and replacing the bearings supporting the rotor.

WILLIAM B. TUCKER.